United States Patent [19]

Hebberd

[11] 4,109,757

[45] Aug. 29, 1978

[54] SELF-ERECTING GEOPHONE UNIT AND METHOD AND SYSTEM FOR USING SAME

[75] Inventor: Harry Clinton Hebberd, Aurora, Colo.

[73] Assignee: Pacific West Exploration Company, Denver, Colo.

[21] Appl. No.: 767,057

[22] Filed: Feb. 9, 1977

[51] Int. Cl.² ............................................ G01V 1/16
[52] U.S. Cl. .................................. 181/401; 181/112; 340/17 R
[58] Field of Search ...................... 181/112, 122, 401; 340/3 PS, 3 T, 8 S, 17, 7 R; 73/654

[56] References Cited

U.S. PATENT DOCUMENTS

| | | | |
|---|---|---|---|
| 2,423,591 | 7/1947 | Flude | 340/7 R |
| 2,551,417 | 5/1951 | Carlisle | 340/3 T |
| 2,568,851 | 9/1951 | Flude | 340/7 R |
| 2,568,851 | 9/1951 | Flude | 340/8 S |
| 2,792,562 | 5/1957 | Baker | 340/17 |
| 3,054,085 | 9/1962 | Alexander | 181/401 |
| 3,753,219 | 8/1973 | King | 340/8 S |
| 3,825,886 | 7/1974 | Thigpen | 340/3 T |
| 3,954,154 | 5/1976 | Kruppenbach et al. | 181/112 |

FOREIGN PATENT DOCUMENTS

| | | | |
|---|---|---|---|
| 665,824 | 7/1963 | Canada | 340/17 |
| 231,130 | 3/1969 | U.S.S.R. | 340/17 |

*Primary Examiner*—Nelson Moskowitz
*Attorney, Agent, or Firm*—Brown & Martin

[57] ABSTRACT

A seismic instrument sensing unit mounting assembly includes an outer housing having an inner spherical chamber with an inner housing having a low center of gravity and a semi-spherical bottom surface cooperatively engaging the spherical walls of the outer housing for sliding thereon to the lowermost point within the spherical chamber and thereby maintain a vertical orientation. A sensing unit having a sensing axis with a preferred vertical orientation mounted within the inner housing such that the unit is maintained with the sensing axis in the vertical orientation regardless of the position or orientation of the outer housing. A number of these self-erecting sensing units are connected together by a suitable tension and conductor cables and are deployed and picked up by a method employing mechanical means. The string of units are rapidly layed out upon the surface of the earth without regard to the orientation of the outer housing.

18 Claims, 6 Drawing Figures

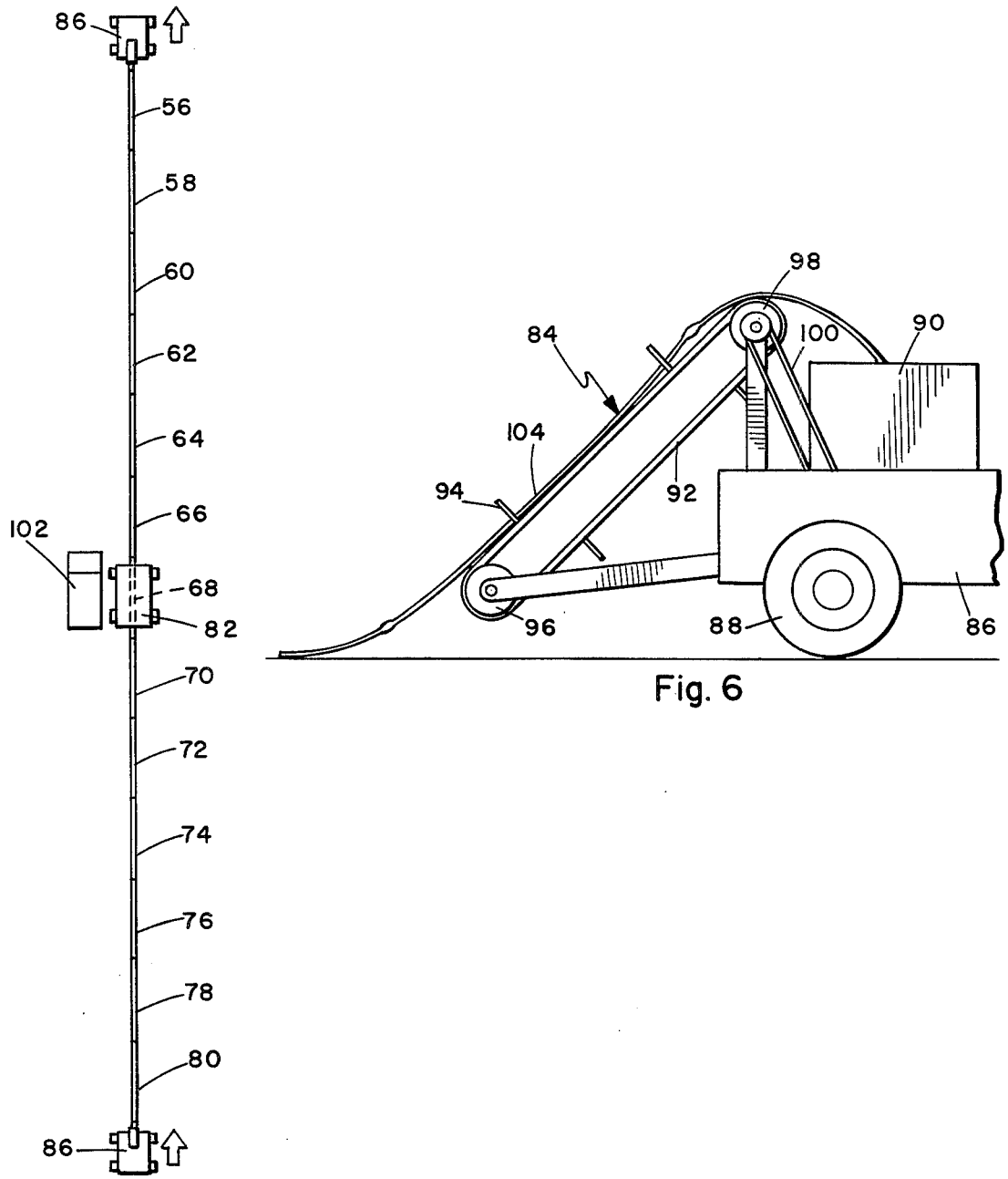

SELF-ERECTING GEOPHONE UNIT AND METHOD AND SYSTEM FOR USING SAME

BACKGROUND OF THE INVENTION

The present invention relates to seismic land exploration and pertains particularly to seismic sensing units and methods of use thereof.

Seismic exploration is a technique commonly employed for exploring and mapping sub-surface formations. Such seismic exploration is used for many purposes such as the location of mineral bodies and reservoirs within sub-surface formations.

Such exploration is typically carried out by means of a system employing a plurality of sensing instruments coupled to the earth's surface which are utilized to detect sound waves travelling through and/or reflecting off of sub-surface formations. Such sound waves may be natural or manmade or may be generated in any number of ways.

The detectors used in such exploration are normally highly sensitive but normally have a single sensing axis. This sensing axis must normally be oriented vertically in order to accurately detect the sound waves which are also preferably travelling vertically. The coupling of the sensing instruments typically referred to as seismometers to the earth's surfaces is also very critical in order to insure that the signals are detected without undue damping.

These seismic exploration methods employ a plurality of the seismometers set out in arrays which may cover areas from a few hundred square yards to a few square miles. These arrays may also be set out in a straight line which may also vary in length anywhere from a few hundred yards to several miles.

Because of the need for vertical orientation of the seismometers as well as for adequate coupling thereof to the ground, a great deal of labor is normally involved in setting out and moving these arrays of seismometers. Many attempts at reducing or eliminating this labor has been proposed in the past. These proposals have involved either attempts to provide a geophone that does not require specific orientation or the provision of geophones which maintain their orientation and may be moved in strings such as towing without manual labor. Examples of the former approach are shown in the following U.S. patents:

U.S. Pat. No. 2,659,065 issued Nov. 10, 1953 to Cordell;

U.S. Pat. No. 2,792,562 issued May 14, 1957 to Baker;

U.S. Pat. No. 3,054,085 issued Sept. 11, 1962 to Alexander;

U.S. Pat. No. 3,810,083 issued May 7, 1974 to Kostelnicek.

An example of the latter is that disclosed in the following patents:

U.S. Pat. No. 3,689,875 issued Sept. 5, 1972 to Kostelnicek;

U.S. Pat. No. 3,825,886 issued July 23, 1974 to Thigpen.

While these proposals have achieved some limited degree of success, they still have some drawbacks.

Accordingly, it is desirable that a seismic sensing instrument be provided that is highly sensitive, self-erecting and easily coupled to the earth's surface.

SUMMARY AND OBJECTS OF THE INVENTION

It is the primary object of the present invention to provide a seismic detector assembly that overcomes the above problems of the prior art.

Another object of the present invention is to provide a self-righting sensitive geophone unit having means to insure that the sensing axis is always maintained in the optimum orientation.

A further object of the present invention is to provide a self-erecting geophone unit that may be quickly and easily laid out without regard to the orientation thereof.

A still further object of the present invention is to provide a self-erecting geophone unit that may be employed in a string connected by conductor cables and tension means that can be readily and easily deployed and retrieved manually or by machine without regard for orientation of the confining cables.

In accordance with the primary aspects of the present invention, a seismic detector assembly includes an outer housing, having an inner curved wall means defining a chamber for confining an inner housing containing a sensing device having a sensing axis, with the inner housing, having cooperating bottom surface engaging the curved walls of the outer housing and maintaining the sensing element axis in its preferred vertical direction. An array of these units are connected together by suitable tension means and conductor cables for ease of laying out arrays of seismic detectors.

BRIEF DESCRIPTION OF THE DRAWING

The above and other objects and advantages of the present invention will become apparent from the following description when read in conjunction with the drawings wherein:

FIG. 4 is a schematic illustration of a typical string of geophones.

FIG. 5 is a top plan view of a typical field array of geophones.

FIG. 6 is a side elevational view of a typical apparatus for deploying and retrieving strings of geophones.

DETAILED DESCRIPTION OF THE PREFERRED EMBODIMENT

Figure 1:
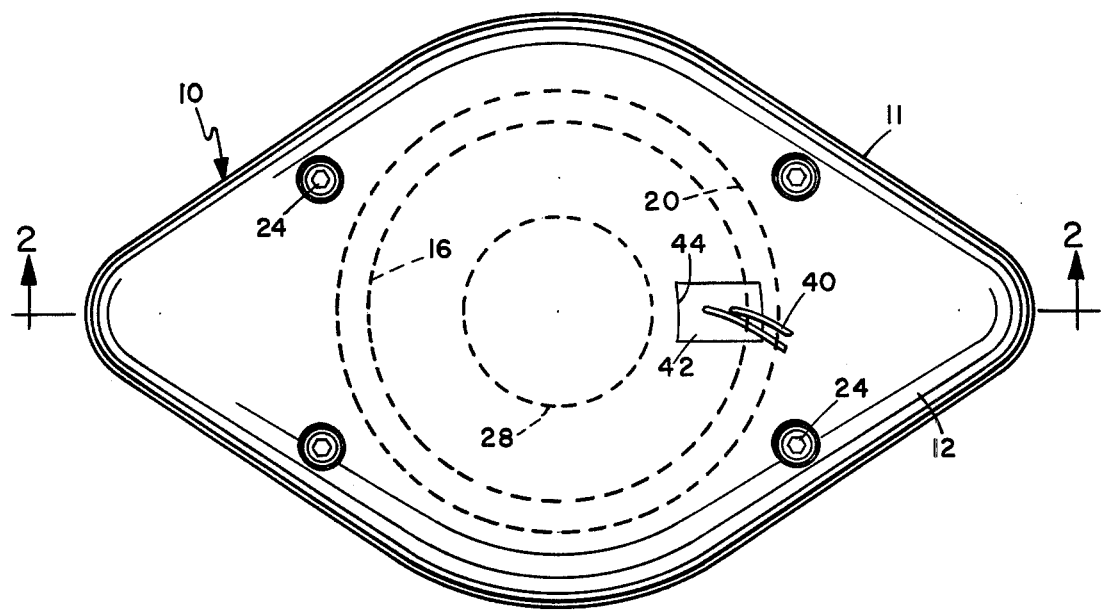
FIG. 1 is a top plan view of a preferred embodiment of a geophone unit in accordance with the present invention.
Figure 2:
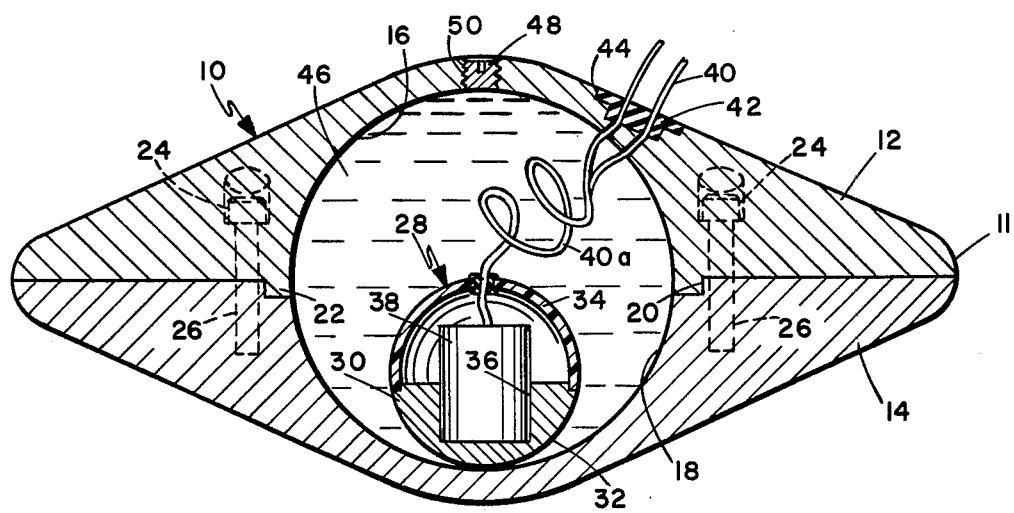
FIG. 2 is a sectional view taken on line 2—2 of FIG. 1.

Turning now to FIGS. 1 and 2 of the drawing, there is illustrated a self-erecting geophone unit in accordance with the present invention, indicated generally by the numeral 10. The geophone unit comprises an outer housing housing 11 comprising a pair of half-shells 12 and 14, each half of the housing includes curved wall means 16 and 18, respectively, defining an inner chamber preferably having a spherical configuration. It will be appreciated that other configurations may also be suitable so long as the walls are curved to provide a low point in any orientation of the outer housing. The two halves of the housing 11 mate together as illustrated and may preferably include a pilot bore 20 and cooperating pilot flange 22 for properly mating and seating of the housings together. The housings may be secured together in a suitable fashion, such as by means of a pair of cap screws 24 through half shell 12 and threadably engaging the threaded bores 26 in the half shell 14.

An inner housing generally designated by the numeral 28 is confined within the chamber defined by the curved walls 16 and 18 and includes a high density or weighted base 30 providing a low center of gravity for the housing. The base 30 includes also, a curved bottom 32 for cooperatively engaging the inner curved walls 16 and 18 of the outer housing for supporting the inner housing thereon. The inner housing 28 may preferably be of a generally spherical configuration and include an upper housing portion 34 of a semispherical configuration connected to the lower weighted portion 30. The lower or bottom portion 30 being considerably heavier than the upper portion 34 insures that the housing will always be vertically oriented with the bottom 30 at the bottom as illustrated. The inner housing when at rest is normally supported safely by the curved bottom 32 thereof resting on curved inner surface 18. The housing 28 includes an inner cylindrical chamber 36 oriented to have a vertical axis and for mounting a sensing element 38 of generally conventional design and configuration. The sensing unit 38 is of the general type having a single sensing axis and which has a normally preferred vertical orientation. Such geophones are of the type such as available from Houston Products and Services, Inc., identified as model number HP-1A identified as a miniature digital grade geophone. Such geophones are highly sensitive and operate most effectively when the sensing axis is in the vertical direction. The upper portion 34 of the inner housing 28 may be hollow as shown and constructed of a suitable material such as a light plastic or the like.

A conductor 40 is connected to the geophone 38 and extends through suitable seal means 42 through a hole or aperture 44 in the housing 12 externally of the housing, for suitable connection to recording equipment or the like. Since the inner housing 28 and associated geophone unit is entirely free within the chamber of the outer housing, the conductor 40 can coil and uncoil as necessary as illustrated at 40a. The conductor 40 is selected to have sufficient resilience and flexibility to permit free movement of the housing 28 within the housing 11.

Preferably the surfaces 32 and the inner walls 16 and 18 of the outer housing are polished and suitably lubricated to permit free sliding movement of the bottom 30 thereon. Thus, with such free sliding movement, the housing 28 will always be oriented in its vertical direction and will slide to the lowermost point of the walls 16 and 18. It may be desirable in many applications to utilize a damping fluid 46 such as a heavy oil or the like within the chamber of the outer housing for damping the movement of the inner housing 28 therein. Such oil would also additionally serve the function of a lubricant to permit or ready sliding movement between the surfaces 32 and 18. A suitable filler plug of the usual type 48 may be screw-threaded in a bore 50 within the half-shell 12 of the housing 10.

Figure 3:
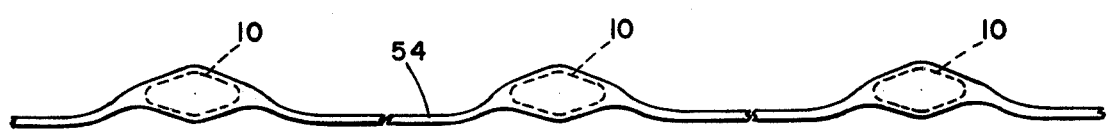
FIG. 3 is an elevational view of an interconnected string of units in accordance with the present invention.

It will be noted that the outer housing as illustrated has a generally ovoid configuration. This configuration, although not necessary, does facilitate the incorporation of the assembly within a typical cable or string configuration as shown in FIG. 3. While the housing 10 may be constructed of any suitable material, such as metal or plastic, or ceramics or the like, a non-magnetic material is preferred in order to avoid interference with the sensing unit 38.

Turning now to FIG. 3, a typical string of geophone units of the present invention is illustrated. In this string, a plurality of geophones 10 are illustrated as connected together by means of a tension cable 54. The tension cable may be of any suitable type such as metal or plastic cable, flexible sheathing or tubing such as a woven wire or woven strands of fabric material. The ovoid shape of the geophone units 10 are such as to facilitate the incorporation thereof within a cable by aligning the major axis thereof along the axis of the cable as illustrated. The cable will also include suitable conductor means conducting or connecting each of the sensing units with suitable instrumentation or recording equipment.

With this arrangement, the cable as illustrated in FIG. 3 may simply be laid out on the surface of the earth without regard to the particular orientation of each of the geophone units. Because of the self-orienting feature thereof, the sensing unit or element itself automatically orients itself with the vertical, such that the sensing axis thereof is properly aligned for receipt of seismic waves reflected from underground formations.

A typical string of geophone units may include up to 24 geophones and each geophone may be spaced a suitable distance such as between 12 to 20 feet apart.

FIG. 4 illustrates a typical wiring diagram of a string of geophones. A string as used herein typically means a plurality of geophones connected together, by or within a cable having a finite length with connecting means at both ends for connecting to another string. Thus a string may be inserted into or removed from a typical array of geophones. As illustrated in FIG. 4, preferably the string includes a plurality of geophones such as up to two dozen with one half of the geophones connected in parallel with the other half of the geophones.

Turning now to FIG. 5, a typical field layout or array of geophones is illustrated in conjunction with typical exploration equipment in accordance with the present invention. A linear array is illustrated wherein a plurality of strings are connected together beginning at the top of the figure designated by the numerals 56 through 80 are strung out in a generally straight line. A recording truck 82 having suitable recording equipment is connected into the array of geophones. The recording truck includes the usual recording equipment for receiving, recording and possibly even translating information picked up by the separate geophones in the array. The wiring of the separate strings through the cable to the recording truck is such that the recording truck can select and record from positions along the cable over several groups of strings. This is accomplished by what is typically referred to as a roll along switch which selects the position along the cable over which the recording will take place.

Typically 48 groups are recorded simultaneously. Thus, a section of strings may be strung out a few miles ahead of the recording truck and a few miles behind the recording truck. The recording truck is tied into the cable at a selected position and through means of the roll along switch may select geophones extending behind the truck for a considerable distance and record from these phones and in sequence move the connection with the recording equipment along the groups up to a certain distance ahead of the recording truck.

Simultaneously, while the recording is taking place strings of cable are being laid out ahead of the recording truck while other strings of cable are being picked up behind the recording truck. This laying out and picking up of the cable may be accomplished manually or by suitable mechanical means.

The cable configuration in accordance with the present invention as well as the self-righting feature thereof makes the present invention readily adapted to mechanical deployment and retrieval. For example, the cables may be simply wound upon a reel mounted up on a suitable vehicle which may be either towed or self-propelled. Thus, when the cable is laid out, the cable is simply unwound from the reel as the vehicle moves along the path along which the cable is to be laid. Similarly in retrieving the geophones, the cable is simply wound upon a drum as the vehicle moves along the path of the cable. Thus in a typical operation, one vehicle may be stringing out cable ahead of the recording truck and simultaneously therewith another vehicle may be taking up cable behind the recording truck. These vehicles can then switch positions as the forward vehicle becomes empty it moves to the back of the line to begin picking up cable while the one at the back of the line when full moves to the front of the line for laying out cable. In this manner a continuous seismic exploration operation may be carried out. One foreseeable problem with this operation, however, is the possibility of tension within the tension cable transmitting vibration between adjacent geophones causing unnecessary and excessive noise or interference with the desired signal.

It will also be appreciated that cables of this nature may be moved along simply by towing behind a vehicle from position to position. Thus, a secton of cables may be laid out in a linear array, for example, and the section recorded. Thereafter, a towing vehicle simply attaches to the front end of the cable and tows it to the next location. Foreseeable difficulties with this arrangement, however, is that length of the sections towed must be limited to prevent excessive tension in the forward end of the line as it is being towed. Another possible problem would of course arise from the tension within the cable during the shooting or recording process resulting in undue interference between the adjacent phones.

One approach to a solution of this problem is as illustrated in FIG. 6 for example, wherein a pick up apparatus generally designated by the number 84 is illustrated for picking up the strings of geophones and storing them on a vehicle. As a typical example, the apparatus includes a suitable vehicle 86 having ground engaging and supporting wheels 88 for supporting the vehicle for traversing the ground. The vehicle may be self-propelled or towed behind another vehicle. Suitable container means 90 is provided for receiving and storing the cables. It will be also appreciated that a drum for winding the cable may be substituted for this storage container. A suitable pick up arrangement comprising a continuous belt or the like 92 having a plurality of fingers 94 extending upward therefrom for straddling and picking up the cable are mounted on the belt 92. The belt is trained over an idler pulley 96 and a drive pulley 98 which is connected to a suitable power source and driven by means 100 such as from a power take off from the prime mover of the vehicle 86.

In laying out the cable, the vehicle is driven along the path of desired location of the section of strings and the belt arrangement 92 is driven in the reverse direction for picking the string 104 of geophones or sections of strings from the container 90 and laying them out on the ground as illustrated in FIG. 6.

When it is desired to pick up a string or a section of string of cables, the apparatus is simply driven along the string of cables with the pick up apparatus picking up the strings of cable and depositing them in the storing container 90. Thus a plurality of these vehicles 86 may be employed as shown in FIG. 5 for simultaneously picking up the cable behind the recording vehicle 82 and laying out the strings of cable ahead of the recording vehicles as illustrated.

While this operation is going on, the recording truck is recording suitable signals generated by suitable means in a conventional manner. The signal may be generated such as by means of an explosive shot placed within a bore in the formation or by other suitable generating means such as vibrators or the like. For example, vehicle 102 having suitable signal generating means is positioned in a desired position with respect to the geophones and the recording truck with the signal generating means coupled to the earth formation for generating a signal. The generating truck may move with the recording truck 82 or move independent thereof as desired.

While the present invention has been described and illustrated by means of specific embodiments, it is to be understood that numerous changes and modifications may be made therein without departing from the spirit and scope of the invention as defined in the appended claims.

Having described my invention, I now claim.

1. A self righting seismic detector assembly, said assembly comprising:
   a sensing instrument having means defining a sensing axis having a preferred vertical orientation;
   an outer housing having curved wall means defining a chamber; and
   an inner housing for mounting said instrument in said preferred vertical orientation independent of the orientation of said outer housing, said inner housing having a high density curved base for defining a low center of gravity and the lower end of said inner housing when said vertical orientation is defined, said inner housing being supported at rest solely by said base normally slidably engaging said curved wall means and sliding to the lowermost point on said wall for assuming said vertical orientation.

2. The detector assembly of claim 1 wherein said curved wall is spherical in configuration, and
   said base is semi-spherical in configuration.

3. The detector assembly of claim 1 wherein:
   said inner housing is of a generally spherical outer configuration.

4. The detector assembly of claim 1 wherein:
   said outer housing is of a generally ovoid outer configuration.

5. The detector assembly of claim 1 wherein:
   said chamber is filled with a damping fluid.

6. The detector assembly of claim 1 including:
   means for communicating said sensing means with the exterior of said outer housing.

7. The detector assembly of claim 6 wherein:
   said means for communicating comprises an electrical conductor connected to said sensing means and extending through the wall of said outer housing.

8. The detector assembly of claim 7 wherein:
   said inner housing is of a generally spherical outer configuration.

9. The detector assembly of claim 8 wherein:
   said outer housing is of a generally ovoid outer configuration.

10. The detector assembly of claim 2 wherein: said inner housing is spherical in configuration and has a diameter less than the radius of said spherical chamber.

11. The detector assembly of claim 2 wherein said chamber is at least partially filled with a liquid.

12. The detector assembly of claim 11 wherein said liquid is a high viscosity oil.

13. The detector of claim 11 wherein the upper portion of said inner housing is hollow.

14. The detector of claim 2 wherein said inner housing includes a cylindrical cavity having a vertically oriented axis for receiving said sensing instrument.

15. A system for rapid land deployment of seismic sensing instruments, said system comprising:
an instrument string comprising a plurality of sensing instruments secured together in spaced relationship by a flexible tension member,
each of said sensing instruments having means defining a sensing axis,
inner and outer housing means for mounting said sensing instrument for maintaining vertical orientation of said sensing axis independent of the orientation of said outer housing, said outer housing having curved wall means defining an enclosed chamber, and said inner housing having a curved bottom for sliding engagement with said curved wall for sliding to the lowermost point thereof for automatically orienting said sensing axis in the vertical direction.

16. The system of claim 15 wherein said system includes pick up means for picking up said instrument string from a position resting on the earths surface.

17. The system of claim 16 including storage means for storing said string.

18. The system of claim 17 wherein said pick up means and said storage means are carried on a mobile vehicle.

* * * * *